(12) United States Patent
Sonobe

(10) Patent No.: US 6,664,000 B1
(45) Date of Patent: Dec. 16, 2003

(54) BATTERY PACK

(75) Inventor: Satoshi Sonobe, Utsunomiya (JP)

(73) Assignee: NEC Mobile Energy Corporation, Utsunomiya (JP)

( * ) Notice: Subject to any disclaimer, the term of this patent is extended or adjusted under 35 U.S.C. 154(b) by 125 days.

(21) Appl. No.: 09/669,837

(22) Filed: Sep. 27, 2000

(30) Foreign Application Priority Data

Sep. 30, 1999 (JP) ............................................ 11-277664

(51) Int. Cl.$^7$ ................................................ H01M 2/34
(52) U.S. Cl. .......................................... 429/61; 429/100
(58) Field of Search ........................... 429/61, 100, 99, 429/98, 97, 96; 320/134, 136

(56) References Cited

U.S. PATENT DOCUMENTS

| | | | | |
|---|---|---|---|---|
| 5,159,258 A | * | 10/1992 | Kolvites et al. ............ | 320/113 |
| 5,573,869 A | * | 11/1996 | Hwang et al. .............. | 429/100 |
| 5,747,189 A | * | 5/1998 | Perkins ........................ | 429/61 |
| 5,912,092 A | * | 6/1999 | Maruyama et al. ......... | 429/121 |
| 6,074,775 A | * | 6/2000 | Gartstein et al. ............ | 429/53 |
| 2003/0027036 A1 | * | 2/2003 | Emori et al. ................. | 429/61 |

* cited by examiner

*Primary Examiner*—Carol Chaney
(74) *Attorney, Agent, or Firm*—Westman, Hattori, Daniels & Adrian, LLP

(57) ABSTRACT

A battery pack arranged to make a judgment concerning a loss of functional status and to perform selectively charge-and-discharge control and forced discharge control according to the judgment. The battery pack includes a charge-and-discharge control device for charging and discharging a battery, a forced discharge control device for forcedly discharging each cell, a function detecting device for detecting a functional status of the battery pack, a judging device for making a judgment concerning a loss of functional status detected by the function detecting device, and a control device for selectively controlling the charge-and-discharge control device and the forced discharge control device according to the judgment concerning a loss of functional status made by the judging device. A battery pack having lost its function owing to the completion of the span of life and a marked degradation in function is judged to be one having lost its functional status, and charge-and-discharge control and forced discharge control are selectively performed according to the judgment.

42 Claims, 6 Drawing Sheets

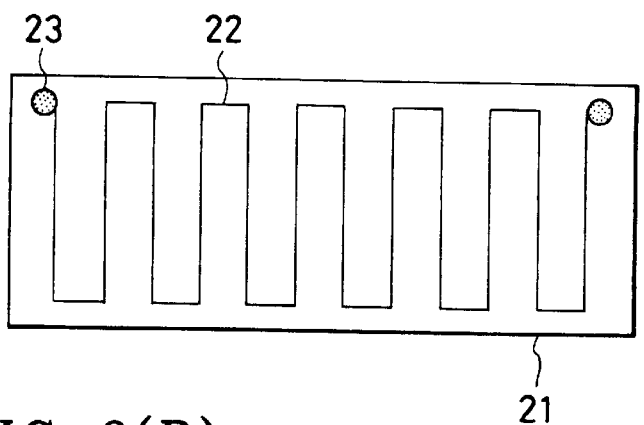
FIG. 3(A)
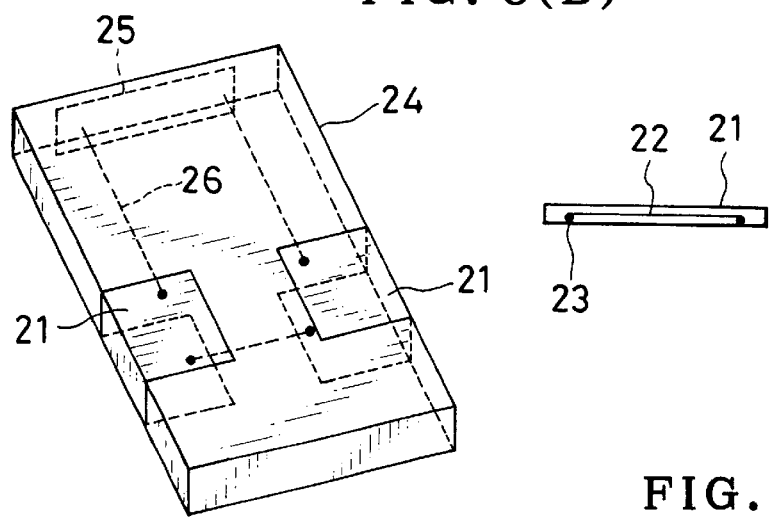
FIG. 3(B)
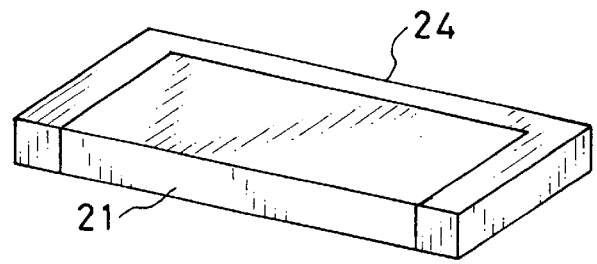
FIG. 3(C)
FIG. 4
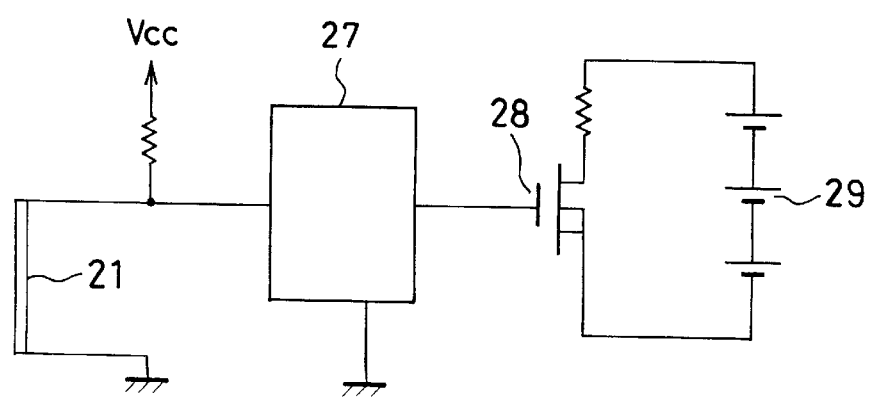

BATTERY PACK

BACKGROUND OF THE INVENTION

The present invention relates to a battery pack arranged to make a judgment concerning a loss of functional status and to perform selectively charge-and-discharge disabling control and forced discharge control according to the judgment.

If a battery pack is continuously used after the lifetime thereof has completed its span, the capacity value reduces extremely. In addition, the battery that has been repeatedly overcharged and overdischarged involves the problem that lithium in the battery is likely to precipitate in the form of dendrite and break through the separator, making a short circuit in the battery and thus causing smoking or ignition. The same problem may arise if the battery pack is brought into an unexpected state by the user's mistake in usage, for example, if the battery pack is disassembled or damaged with a sharp-edged metal.

Moreover, although batteries should be disposed of as industrial waste by specific disposers, there is a possibility that batteries may be disposed of as they are, together with combustible substances. In such a case, if an existing battery pack that is overcharged, for example, is brought into a dangerous state, smoking or ignition is likely to occur.

SUMMARY OF THE INVENTION

In view of the above-described problems, an object of the present invention is to judge whether or not a battery pack has lost its function owing to the completion of the span of life and a marked degradation in function and to limit the use of the battery pack judged to be unusable by executing appropriate processing.

To attain the above-described object, the present invention provides a battery pack arranged to make a judgment concerning a loss of functional status and to perform selectively charge-and-discharge control and forced discharge control according to the judgment. The battery pack includes a charge-and-discharge control device for charging and discharging a battery and a forced discharge control device for forcedly discharging each cell. A function detecting device detects a functional status of the battery pack. A judging device makes a judgment concerning a loss of functional status detected by the function detecting device. A control device selectively controls the charge-and-discharge control device and the forced discharge control device according to the judgment concerning a loss of functional status made by the judging device, whereby charge-and-discharge control and forced discharge control are selectively performed according to the judgment concerning a loss of functional status.

The function detecting device may include a timer for measuring the elapsed time since the date of manufacture. In this case, the judging device judges whether or not there is a loss of functional status according to whether or not the elapsed time is more than a predetermined value. The function detecting device may include, in addition to the timer, one of a counting device for counting the number of charge/discharge cycles, a temperature detecting device for detecting an average temperature of the battery pack, and a measuring device for measuring the charging rate of the battery pack. In this case, the elapsed time is corrected by one of the number of charge/discharge cycles, the average temperature and the charging rate. The function detecting device may include a temperature detecting device for detecting an average temperature and a timer for measuring the elapsed time since the date of manufacture in accordance with a doubling rule by which a period of time elapsed is doubled for every 10° C. rise in the average temperature. In this case, the judging device judges whether or not there is a loss of functional status according to whether or not the elapsed time is more than a predetermined value. The function detecting device may include a counting device for counting the number of charge/discharge cycles. In this case, the judging device judges whether or not there is a loss of functional status according to whether or not the number of charge/discharge cycles is more than a predetermined value. The function detecting device may include a capacity detecting device for detecting a full-charge capacity. In this case, the judging device judges whether or not there is a loss of functional status according to whether or not the full-charge capacity is less than a predetermined value. The function detecting device may include a device for accumulating a discharge or charge capacity. In this case, the judging device judges whether or not there is a loss of functional status according to whether or not the accumulated capacity value is more than a predetermined value.

The function detecting device may include a device for measuring a temperature and an electric current. In this case, the judging device judges whether or not there is a loss of functional status according to whether or not the charge-and-discharge efficiency at a predetermined temperature and a predetermined current value measured by the device is less than a predetermined value. The function detecting device may include a device for measuring a temperature and an electric current. In this case, the judging device judges whether or not there is a loss of functional status according to whether or not the self-discharge current from the battery at a predetermined temperature measured by the device is more than a predetermined value. The function detecting device may include a device for detecting an electric current. In this case, the judging device judges whether or not there is a loss of functional status from the value of charge/discharge current measured by the device. The function detecting device may include a device for detecting a cell voltage. In this case, the judging device judges whether or not there is a loss of functional status from the value of the cell voltage. The function detecting device may include a device for detecting a battery voltage and an electric current. In this case, the judging device judges whether or not there is a loss of functional status from the battery voltage and electric current value detected by the detecting device. The function detecting device may include a device for detecting a temperature. In this case, the judging device judges whether or not there is a loss of functional status according to whether or not the temperature of the battery pack or the temperature of the cell is more than a predetermined value, or whether or not the time interval during which the temperature of the battery pack or the temperature of the cell is more than a predetermined value is more than a predetermined period of time. The function detecting device may include a device for detecting the temperature at each of at least three points. In this case, the judging device judges whether or not there is a loss of functional status according to whether or not the difference between the temperature at one of the three points and an average value of the temperatures at the other two of the three points is more than a predetermined value. The function detecting device may include a device for measuring the internal impedance at a predetermined temperature. In this case, the judging device judges whether or not there is a loss of functional status according to whether or not the internal impedance is more than a predetermined value. The function detecting device may include a device for detecting a battery voltage, an electric current and a temperature. In this case, when there is a large variation in the battery voltage, the sampling period for detection of the battery voltage, the electric current and the temperature is shortened. The function detecting device and the judging device may have a non-volatile memory for storing detection data and judgment data when there is a drop in battery voltage.

The function detecting device may include a label to be stuck on the battery pack or the cell, the label having a conductor wire or a thin conductive film disposed all over the reverse side thereof. In this case, the judging device judges whether or not there is a loss of functional status according to whether or not the label is separated or whether or not the conductor wire is broken. The function detecting device may include a pressure sensor or an impact sensor. In this case, the judging device judges whether or not there is a loss of functional status according to whether or not a pressure or impact applied to the battery pack is more than a predetermined value, or whether or not a pressure or impact more than a predetermined value has been applied to the battery pack more than a predetermined number of times, or whether or not a pressure or impact more than a predetermined value has been applied to the battery pack for more than a predetermined period of time. The function detecting device may include a strain sensor for detecting a strain on the battery pack. In this case, the judging device judges whether or not there is a loss of functional status according to whether or not the strain is more than a predetermined value. The function detecting device may include a gas sensor for detecting a leakage of the electrolyte. In this case, the judging device judges whether or not there is a loss of functional status according to whether or not the value of detected gas leakage is more than a predetermined value. The function detecting device may include one or a plurality of thermal fuses disposed at places on the circuit board where heat may be generated. In this case, the judging device judges that there is a loss of functional status from fusing of any of the thermal fuses.

In addition, the arrangement may be such that on condition that the judging device has judged that there is a loss of functional status, the control device disables charging or both charging and discharging through the charge-and-discharge control device and moreover forcedly discharges each cell of the battery pack through the forced discharge control device. The charge-and-discharge control device may disable charging or both charging and discharging through a semiconductor device for on-off controlling charging and discharging or a thermal fuse inserted in the current path for charging and discharging, the thermal fuse being fused when charging or both charging and discharging are to be disabled. The arrangement may also be such that according to the judgment concerning a loss of functional status made by the judging device, the control device performs one of the operation of disabling charging or both charging and discharging, the operation of inhibiting charging or both charging and discharging and the operation of stopping charging or discharging by controlling the charge-and-discharge control device and forcedly discharges each cell by controlling the forced discharge control device and further performs control for issuing an alarm according to need. In addition, the control device may perform control for filling a flame-resisting substance into the battery pack according to the judgment concerning a loss of functional status made by the judgment device.

In addition, the present invention provides a battery pack arranged to make a judgment concerning a loss of functional status and to perform selectively charge-and-discharge control and forced discharge control according to the judgment. The battery pack includes a charge-and-discharge control device for charging and discharging a battery and a forced discharge control device for forcedly discharging each cell. A liquid detecting device detects a liquid leakage in the battery pack. A control device disables charging or both charging and discharging by controlling the charge-and-discharge control device and forcedly discharges each cell of the battery pack by controlling the forced discharge control device on condition that a liquid leakage has been detected by the liquid detecting device. The control for disabling charging or both charging and discharging may be performed through a fusible portion that is fused by detecting a liquid.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 3 is a diagram showing an embodiment of a label for detecting disassembling of a battery pack, damage thereto, etc.

FIG. 4 is a diagram showing an embodiment in which a battery is forcedly discharged upon detection of a label abnormality.

DESCRIPTION OF PREFERRED EMBODIMENTS

Figure 1:
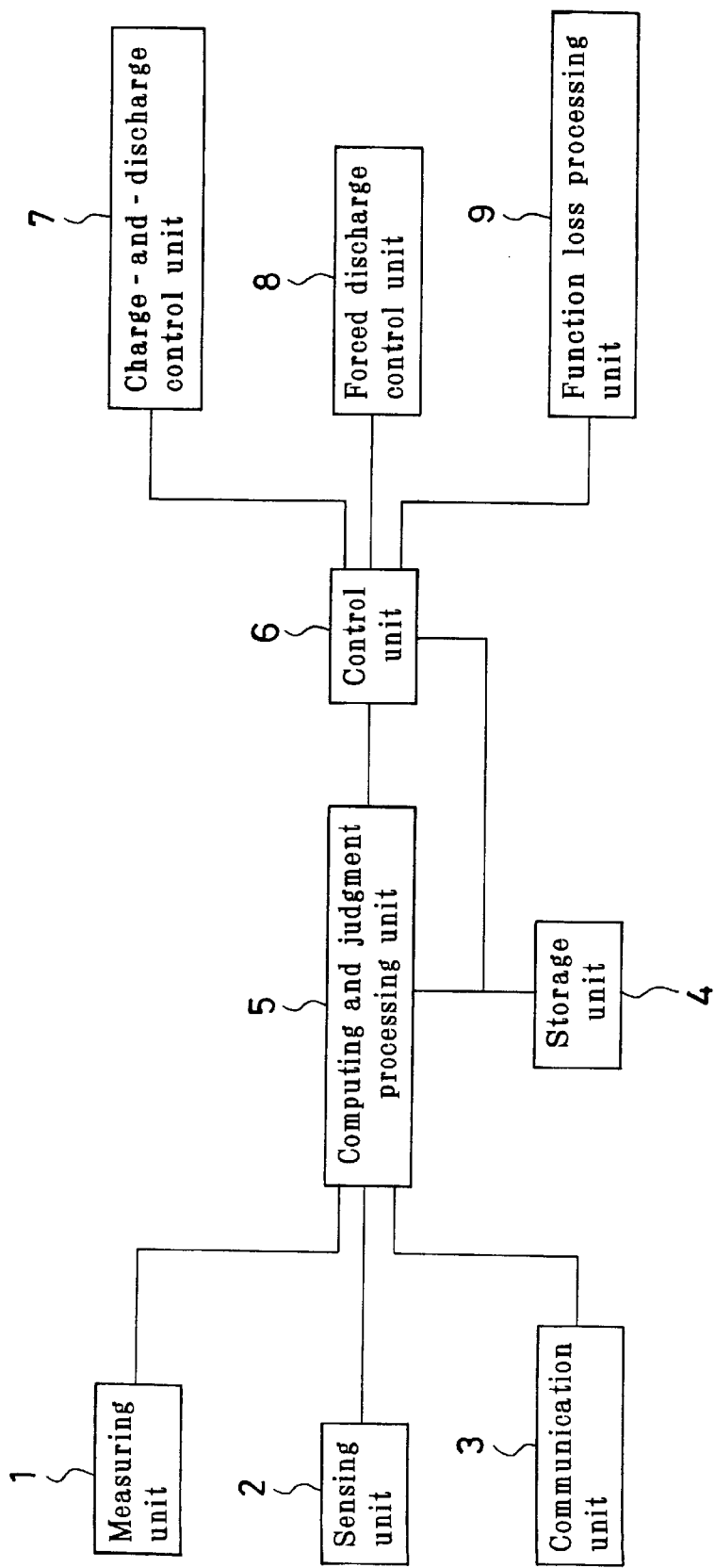
FIG. 1 is a block diagram showing an embodiment of the battery pack according to the present invention.

FIG. 1 is a block diagram showing an embodiment of the battery pack according to the present invention. The battery pack includes a measuring unit 1, a sensing unit 2, a communication unit 3, a storage unit 4, a computing and judgment processing unit 5, a control unit 6, a charge-and-discharge control unit 7, a forced discharge control unit 8, and a function loss processing unit 9.

In FIG. 1, the measuring unit 1 measures the elapsed time since the date of manufacture of the battery pack, which has a plurality of cells connected in series, charge-and-discharge efficiency, charge-and-discharge capacity, current, voltage, temperature, internal impedance at a predetermined temperature, impact, pressure, strain, etc. Examples of the measuring unit 1 are a timer, a charge/discharge current detecting circuit, a battery voltage detecting circuit, a temperature sensor, a counter for counting the number of battery pack charge/discharge cycles, an impact sensor, a pressure sensor, a strain sensor, etc. The sensing unit 2 senses the abnormal state of the battery pack when disassembled, damaged or brought into other abnormal conditions. For example, the sensing unit 2 is an abnormality-sensing label covering the battery pack or a gas sensor for sensing a liquid leakage. The communication unit 3 communicates with an external device. For example, the communication unit 3 is a device for acquiring the present date from an external device by communication. The storage unit 4 stores data used as a reference for a judgment concerning a loss of functional status. For example, the storage unit 4 stores data concerning the date of manufacture and predetermined values for elapsed time, charge-and-discharge efficiency, charge-and-discharge capacity, current, voltage, temperature, internal impedance, impact, pressure, strain, etc. In this embodiment, the judgment concerning a loss of functional status is a judgment as to whether or not the battery pack has lost its functional status, i.e. the ability to function normally, which is made by, for example, judging whether or not the lifetime thereof has completed its span, or whether or not the battery pack is in an abnormal state, or whether or not the abnormal state has been repeatedly detected more than a predetermined number of times or for more than a predetermined period of time.

The computing and judgment processing unit 5 executes various computations for making a judgment concerning a loss of functional status on the basis of information obtained from the measuring unit 1, the sensing unit 2 and the communication unit 3 and judges whether or not there is a loss of functional status on the basis of the acquired information and information obtained from each computation. The control unit 6 controls the charge-and-discharge control unit 7, the forced discharge control unit 8 or the function loss processing unit 9 according to a judgment concerning a loss of functional status made by the computing and judgment processing unit 5. The charge-and-discharge control unit 7 controls charging and discharging of the secondary battery. The forced discharge control unit 8 forcedly discharges the secondary battery. The function loss processing unit 9 executes processing for sounding an alarm, e.g. a beep, or processing for delivering an alarm to an external device (e.g. a host device), or processing for filling a flame-resisting substance into the battery pack. According to the judgment concerning a loss of functional status made by the computing and judgment processing unit 5, the control unit 6 controls the charge-and-discharge control unit 7, the forced discharge control unit 8 or the function loss processing unit 9 so that either or both charging and discharging are stopped or inhibited and, at the same time, the battery is forcedly discharged, or charging or both charging and discharging are disabled and an alarm is issued. These control operations are carried out when the following conditions are met.

First, charging or both charging and discharging are disabled and, at the same time, each cell of the battery pack is forcedly discharged, for example, when the elapsed time since the date of manufacture has exceeded a predetermined value, or when the temperature of the battery pack is more than a predetermined temperature, or when the period of time during which the temperature of the battery pack is more than a predetermined value has exceeded a predetermined value, or when it is judged that the battery pack has been disassembled, or when the gas concentration is more than a predetermined value upon detection of a leakage of the electrolyte from the battery with a gas sensor, or when the difference between the minimum cell voltage and the maximum cell voltage is more than a predetermined value, or when a state where the cell voltage is not less than a predetermined value, e.g. 4.4 V, has continued for a predetermined period of time, or when a strain due to swelling of the battery caused by overcharging, which is detected with a strain sensor, is more than a predetermined value. When a state where the cell temperature is in excess of a predetermined value has continued for a predetermined period of time, either or both charging and discharging are inhibited and, at the same time, the battery is forcedly discharged.

Charging or both charging and discharging are disabled, for example, when the internal impedance measured at a predetermined temperature is more than a predetermined value, or when the full-charge capacity of the battery pack has reduced to a predetermined value, e.g. 50% or less of the design value or the initial full-charge capacity, or when the cumulative discharge capacity or charge capacity has reached a predetermined value, e.g. 1,000 times the initial full-charge capacity or the design capacity, or when the counted number of battery pack charge/discharge cycles has exceeded a predetermined value, e.g. 3,000, or when the charge-and-discharge efficiency of the battery pack measured at a predetermined temperature and a predetermined current value has reduced to a predetermined value, or when the detected impact or pressure on the battery pack is more than a predetermined value, or when an impact or pressure exceeding a predetermined value has been repeatedly applied to the battery pack more than a predetermined number of times or for more than a predetermined period of time, or when a peak current exceeding a predetermined value has flowed, or when a peak current exceeding a predetermined value has flowed intermittently for a predetermined period of time or a predetermined number of times, or when a current value calculated from a variation in battery voltage value has exceeded a predetermined value owing to an abnormal flow of current bypassing a current detecting resistor due, for example, to a short circuit in a protective circuit board, or when a small-sized primary battery incorporated as a backup battery for a memory, e.g. an SRAM, has become exhausted.

Temperature detecting devices are provided at at least three positions within the battery pack. Charging or both charging and discharging are stopped when the value of temperature detected with one of the three temperature detecting devices is more or less than an average value of the other two detected temperature values in excess of a predetermined range (individually set to prevent delay in detection of an abnormal temperature which would occur if a judgment is made on the basis of absolute values of temperatures when the ambient temperature is low). When an abnormality is detected during discharging, charging or both charging and discharging are stopped after discharging has stopped except when a serious failure such as smoking or ignition may occur if discharging is stopped immediately, for example, when there is a temperature abnormality, an overcurrent abnormality or the like. Charging or both charging and discharging are inhibited when the battery pack is not fully charged even if an electric current more than a predetermined value has flowed for more than a predetermined period of time, or when the precharge time is longer than a predetermined period of time despite the fact that an electric current with a predetermined value is flowing, although when the battery is precharged in a state where the battery voltage is less than a predetermined voltage, the charging mode shifts to boosting charge upon completion of normal precharging performed for a predetermined period of time.

The battery pack has a device for detecting a self-discharge current from the battery at a predetermined temperature. When the value detected with the device is more than a predetermined value, charging is disabled. When a peak current exceeding a predetermined value has flowed, or a peak current exceeding a predetermined value has flowed intermittently for a predetermined period of time or a predetermined number of times, charging or both charging and discharging are temporarily disabled. After a predetermined period of time has passed, a charge-and-discharge control FET is turned on. If a peak current exceeding a predetermined value has flowed again repeatedly, discharging is inhibited. When such a peak current flows even after the described control has been repeated a predetermined number of times, e.g. 3 times, charging and discharging are disabled permanently. When the expiration of the lifetime or a danger is detected, an alarm is delivered to the external host device by communication, or an alarm is outputted with a buzzer or the like. An alarm is delivered to the external device when the user consents to disable the battery pack in response to a message asking for the user's consent. If the user does not give consent, an alarm is issued periodically. This is done because it might be inconvenient for the user to have the battery pack disabled suddenly. An alarm is also issued when the expiration of the lifetime or a danger is detected, or when a predetermined period of time has elapsed from the date of manufacture to a time just before the expiration of the lifetime, or when the counted number of battery pack charge/discharge cycles has exceeded a predetermined value, e.g. 2,000, or when an impart or pressure exceeding a predetermined value is applied to the battery pack.

Figure 2:
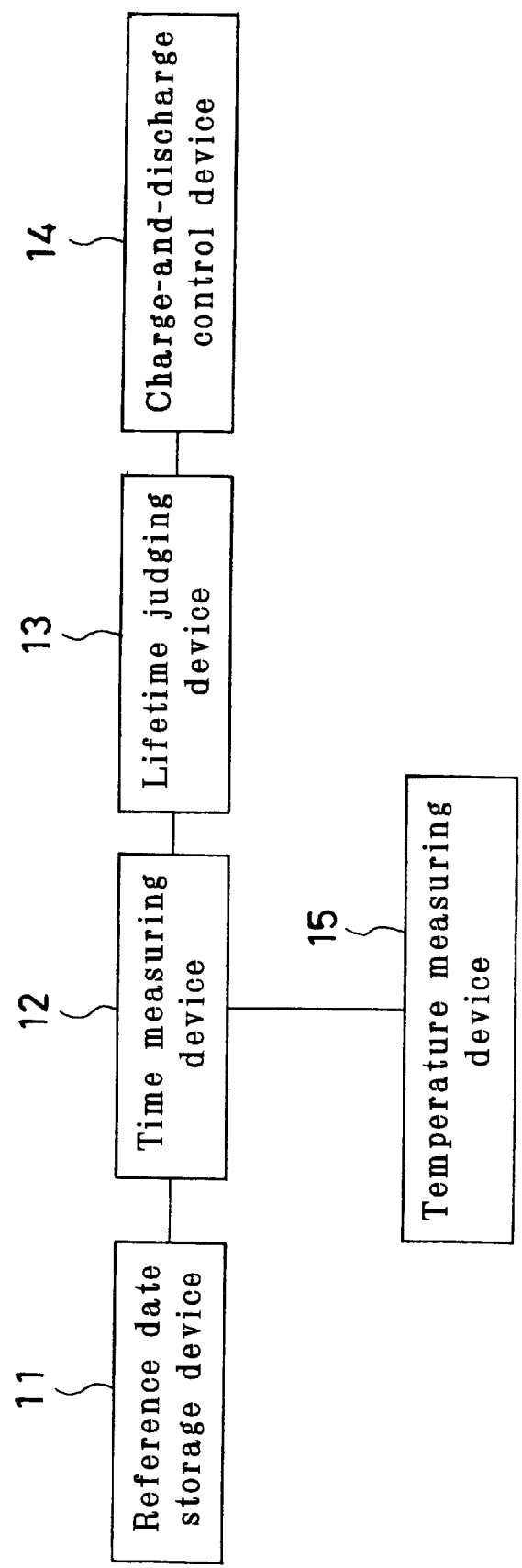
FIG. 2 is a block diagram showing an embodiment of the battery pack according to the present invention in which charge-and-discharge control is performed on the basis of a lifetime judgment.

The following is a description of embodiments of the battery pack according to the present invention in which processing corresponding to each abnormal condition is executed. FIG. 2 is a block diagram showing an embodiment of the battery pack according to the present invention in which charge-and-discharge control is effected on the basis of a lifetime judgment. The battery pack according to this embodiment includes a reference date storage device 11, a time measuring device 12, a lifetime judging device 13, a protecting device 14, and a temperature measuring device 15. In FIG. 2, the reference date storage device 11 stores the date of manufacture of the battery pack. The time measuring device 12 measures the elapsed time since the date of manufacture stored in the reference date storage device 11. The lifetime judging device 13 judges whether or not the elapsed time measured by the time measuring device 12 has exceeded a predetermined period of time, for example, whether or not more than 5 years has elapsed since the date of manufacture. The protecting device 14 controls charging and discharging on the basis of the judgment made by the lifetime judging device 13 such that the battery pack having aged for more than 5 years since the date of manufacture, for example, is disabled from charging or both charging and discharging, and further each cell of the battery pack is forcedly discharged. The temperature measuring device 15 measures the temperature in a case where the measurement of elapsed time is made to reflect the fact that the lifetime shortens as the temperature becomes higher. In this case, the time measuring device 12 increases progressively the count of elapsed time according to an average temperature or a peak temperature measured during a predetermined time interval. For example, the time measuring device 12 counts the elapsed time in accordance with a 10° C. doubling rule, for example. The term "10° C. doubling rule" means that, for every 10° C. rise in the average temperature, the period of time that is judged to be a lifetime is halved, i.e. the elapsed time is doubled. That is, when the average temperature is 20° C., the lifetime is judged to be 5 years; when the average temperature is 30° C.; the lifetime is judged to be 2.5 years; when the average temperature is 40° C., the lifetime is judged to be 1.25 years; and when the average temperature is 50° C., the lifetime is judged to be 0.625 year.

Assuming that the lifetime is L, the total lifetime is LT, an average temperature or a peak temperature during a predetermined time interval is Tpi, a reference temperature (e.g. 20° C.) is Ts, and a predetermined time interval is $\Delta ti$, the lifetime L of the battery pack at a certain point of time can be obtained from $$L = LT - \sum_{i=1}^{n} (2^{(TPi-Ts)/10}) \times \Delta ti$$

Accordingly, when the average temperature during a predetermined time interval is 20° C., $\Delta ti$ is subtracted from the given total lifetime as it is. When the average temperature during a predetermined time interval is 30° C., double $\Delta ti$ is subtracted from the total lifetime.

If a device for acquiring the present date from an external device by communication is used as the time measuring device 12, the lifetime judging device 13 can calculate the elapsed time on the basis of the date of manufacture stored in the reference date storage device 11 and the present date acquired by communication. Thus, it is possible to judge whether or not more than 5 years has elapsed. The lifetime judging device 13 may be arranged to output an alarm before 5 years has elapsed since the date of manufacture, for example, when it is judged that 3 years has passed. Alternatively, the lifetime judging device 13 may have a device for counting the number of battery pack charge/discharge cycles so that an alarm is outputted when the counted number of cycles has exceeded a predetermined value, e.g. 2,000. The arrangement may also be such that the full-charge capacity is stored for each charge/discharge cycle, and the change of the full-charge capacity is approximated by a straight line, a curve or a polygon to estimate the number of cycles at which the full-charge capacity will become less than a predetermined capacity value, thereby estimating a lifetime. The estimated lifetime value may be transmitted to the host device upon demand. The lifetime is judged from a combination of the number of cycles and the elapsed time since the date of manufacture. For example, when the number of cycles is 100, the full-charge capacity is reduced by 5%, and when the elapsed time is 1 year, the full-charge capacity is reduced by 10%. It should be noted that the elapsed time may be corrected by the average temperature and charging rate of the battery pack.

For example, when the control microcomputer shuts down because the battery voltage has dropped below 2.0 V per single cell, the elapsed time is stored in a non-volatile memory before the microcomputer shuts down. When the microcomputer starts after the battery has been charged, time is measured in succession to the elapsed time stored in the non-volatile memory. When first charging is performed after the microcomputer has shut down, the microcomputer starts first. Then, the battery voltage or cell voltage at this time is measured, and the time interval during which the microcomputer was in the shut-down state is estimated from the drop in battery voltage or cell voltage, thereby eliminating a blank in the elapsed time. Thereafter, full-scale charging of the battery is begun. It should be noted that after the microcomputer has shut down, the elapsed time is measured with power supplied from a small-sized primary battery incorporated as a backup battery for a memory, e.g. an SRAM. Charging and discharging are disabled when the small-sized primary battery has become exhausted.

Once the single cell voltage drops below a predetermined voltage, e.g. below 1 V, charging or both charging and discharging are disabled. Usually, such an abnormality occurs after the microcomputer has shut down. Therefore, to detect such an abnormality, the charge-and-discharge control FET is turned off when the battery is charged, and an electric current sufficient to start with the microcomputer is kept flowing through a resistor and a diode. If the voltage of each cell measured by the microcomputer is not less than 1 V, the charge-and-discharge control FET is turned on. If the cell voltage is less than 1 V, the charge-and-discharge control FET is kept off.

Once the expiration of the lifetime or a danger is detected, the microcomputer turns off the charge-and-discharge control FET. In such a case, after the microcomputer has shut down because of the drop in battery voltage, the microcomputer is reset undesirably. Consequently, it becomes undesirably possible to recharge the battery. Therefore, to prevent the battery from being recharged, information indicating that the expiration of the lifetime or a danger has been detected is stored in the non-volatile memory.

Figure 5:
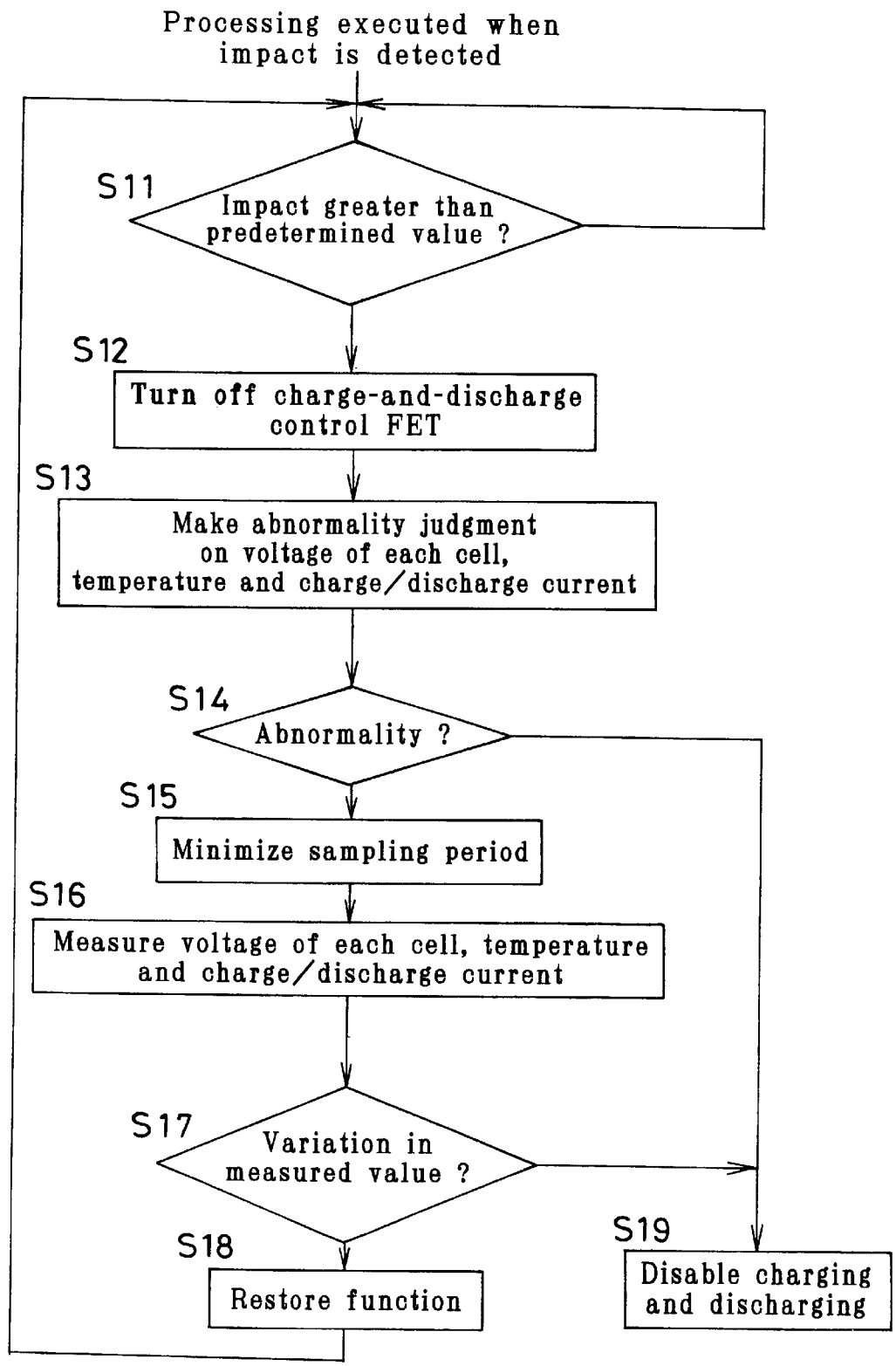
FIG. 5 is a flowchart for describing an example of processing executed when an impact is detected.

FIG. 3 is a diagram showing an embodiment of a label for detecting disassembling of the battery pack or damage thereto. FIG. 4 is a diagram showing an embodiment in which the battery is forcedly discharged when a label abnormality is sensed. FIG. 5 is a flowchart for describing an example of processing executed when an impact is detected. In the figures: reference numeral 21 denotes a label; 22 and 26 denote conductive portions; 23 denotes a contact conductor portion; 24 denotes a battery pack; 25 denotes a circuit board; 27 denotes a control IC; 28 denotes a discharge circuit; and 29 denotes a battery.

As shown in part (A) of FIG. 3, a label 21 has a conductor wire 22 disposed all over the reverse side thereof. The conductor wire 22 has contact conductor portions 23 at both ends thereof. As shown in parts (B) and (C) of FIG. 3, the label 21 is stuck on the surface of the casing of a battery pack 24. The label 21 connects at the contact conductor portions 23 to conductive portions 26 connecting to a circuit board 25 provided in the casing. To detect disassembling of the battery pack 24, as shown in part (B) of FIG. 3, the label 21 is stuck on a portion of the battery pack 24 where the label 21 is likely to be removed during disassembling. Thus, disassembling of the battery pack 24 is sensed when the conductor wire 22 on the label 21 is cut off or when either of the contact conductor portions 23 is separated. To detect cutting, pricking, damage, etc., as shown in part (C) of FIG. 3, the label 21 is stuck on the casing of the battery pack 24 in such a manner as to cover the casing. When the conductor wire 22 on the label 21 is cut off, cutting, pricking or damage done to the battery pack 24 is sensed. Disassembling of the battery pack 24 is also sensed. It should be noted that a thin conductive film may be disposed all over the reverse side of the label in place of the conductor wire. In this case also, it is possible to detect that the label has been broken to disassemble the battery pack. The position on which the label is stuck is not limited to the casing of the battery pack. The label may be stuck on a cell in the battery pack.

The following is a description of an embodiment in which the battery is forcedly discharged upon detection of a label abnormality. The label 21 stuck on the surface of the casing of the battery pack 24, as shown in part (B) or (C) of FIG. 3, is, as shown in FIG. 4, connected in series to a grounded circuit for the control bias voltage Vcc of the battery pack, and the electric potential on the side of the label 21 remote from the grounding terminal, i.e. the control bias voltage Vcc side potential of the label 21, is monitored by a control IC 27, e.g. a microcomputer. When the conductor wire 22 of the label 21 is cut off or either of the contact conductor portions 23 is separated as a result of disassembling of the battery pack 24 or cutting, pricking or damage done to the casing, the grounded circuit is cut off. Consequently, the control bias voltage Vcc is isolated from ground. As a result, the monitored level rises from the ground potential to Vcc. Upon detection of this state, the control IC 27 turns on the discharge circuit 28 to discharge the battery 29 forcedly. In addition, the control IC 27 disables charging or both charging and discharging.

As shown in FIG. 5, when an impact exceeding a predetermined value is applied to the battery pack (step S11), the charge-and-discharge control FET is once turned off (step S12) to disable charging and discharging. Thereafter, the voltage value of each cell, the temperature at each portion and the charge/discharge current value are compared to respective data before the detection of the impact (step S13) to judge whether or not there is an abnormality (step S14). The judgment as to whether or not there is an abnormality in the charge/discharge current may be made by judging if no electric current flows although the charge-and-discharge control FET is turned on. Thereafter, the sampling period for each measurement is shortened (step S15) to measure the voltage value of each cell, the temperature at each portion and the current value with the shortened sampling period for a predetermined period of time (step S16). Then, a judgment is made as to whether or not there is a variation in the measured value (step S17). If it is confirmed that the battery pack is normal, charging and discharging are enabled to restore the function of the battery pack (step S18). During the time interval when charging and discharging are kept disabled, an alarm is transmitted to the external host device. Alternatively, an alarm is outputted, for example, by flashing an LED for displaying the residual battery capacity. When there are sharp variations in the battery voltage, the sampling period for each measurement of voltage, current and temperature is shortened to monitor variations in the battery voltage, current and temperature.

Figure 6:
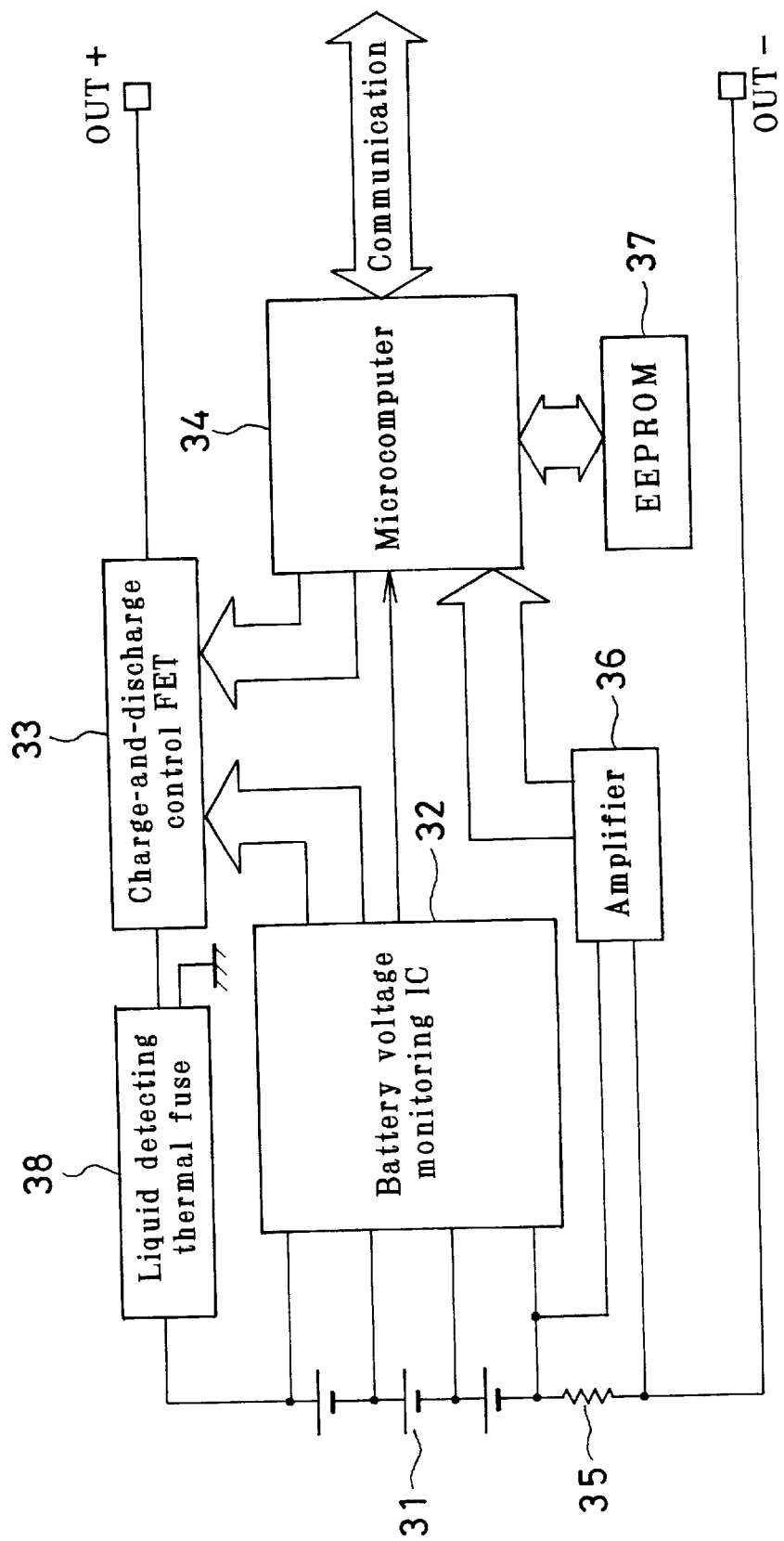
FIG. 6 is a diagram showing another embodiment of the battery pack according to the present invention in which a charge-and-discharge circuit is broken when necessary.
Figure 7:
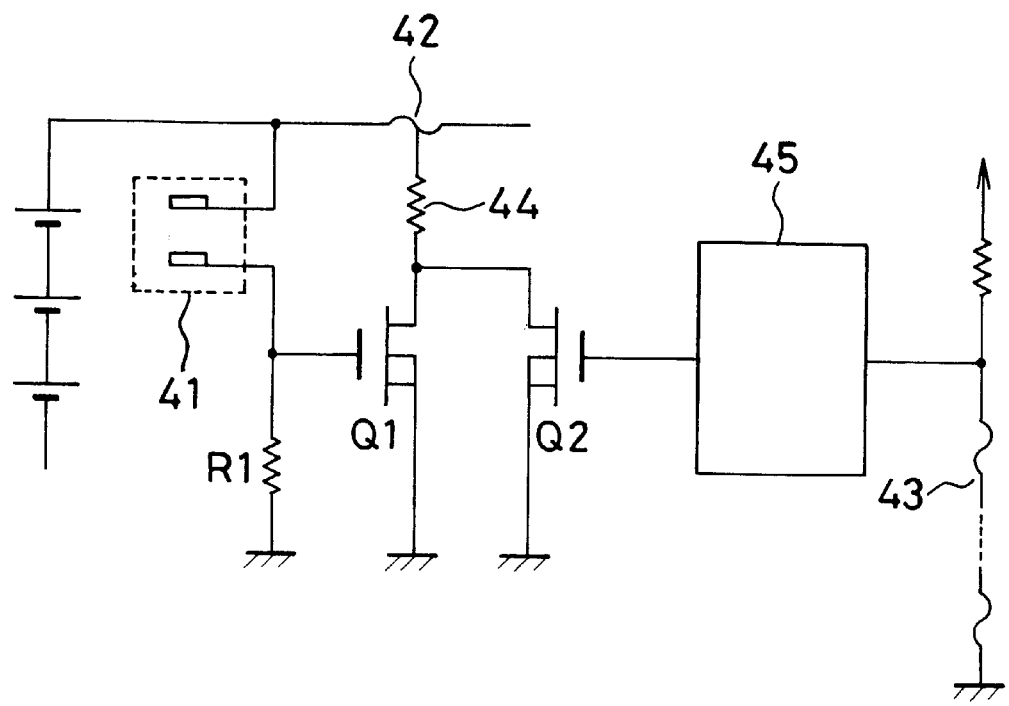
FIG. 7 is a diagram showing a structural example in which liquid and abnormal temperature detection is effected by using a thermal fuse.

FIG. 6 is a diagram showing another embodiment of the battery pack according to the present invention in which a charge-and-discharge circuit is broken when necessary. FIG. 7 is a diagram showing a structural example in which liquid and abnormal temperature detection is effected by using a thermal fuse. In the figures, reference numeral 31 denotes a battery; 32 denotes a battery voltage monitoring IC; 33 denotes a charge-and-discharge control FET; 34 denotes a control microcomputer; 35 denotes a current detecting resistor; 36 denotes an amplifier; 37 denotes an EEPROM; 38 denotes a liquid detecting thermal fuse; 41 denotes a liquid detecting unit; 42 and 43 denote thermal fuses; 44 denotes a heating resistor; 45 denotes a microcomputer; and Q1 and Q2 denote control FETs.

In FIG. 6, the battery 31 is a secondary battery having three cells connected in series. The current detecting resistor 35 detects a charge/discharge current I of the battery 31. The amplifier 36 amplifies a small voltage detected by the current detecting resistor 35. The control microcomputer 34 performs control in the battery pack. The control microcomputer 34 executes arithmetic processing for the control and communicates with an external host device. The EEPROM 37 is a storage device for storing a program, control data, etc. The battery voltage monitoring IC 32 is a protecting IC that detects the battery voltage and performs charge-and-discharge control. The charge-and-discharge control FET 33 on-off controls charging and discharging in response to a signal from the battery voltage monitoring IC 32 or the control microcomputer 34.

The liquid detecting thermal fuse 38 has a liquid detecting portion disposed near a place where a liquid may enter, such as a connector portion. The liquid detecting thermal fuse 38 further has a fusible portion disposed at least 10 millimeters apart from the liquid detecting portion so that the fusible portion is thermally separated from the liquid detecting portion. When a liquid is detected, the fusible portion is fused, and each cell is forcedly discharged. The fusible portion is sealed with a sealing material, e.g. silicon, so that if a liquid enters the liquid detecting thermal fuse 38, it will not contact the fusible portion. If the liquid detecting portion and the fusible portion are close to each other so that a liquid at the liquid detecting portion is evaporated by heat generated from the fusible portion, the fuse is not fused. If this is repeated many times, the fuse becomes unable to fuse. To prevent the occurrence of such a problem, the liquid detecting thermal fuse 38 is arranged as stated above.

As voltage detecting lead wires connecting the battery 31 and the battery voltage monitoring IC 32, lead wires having a resistance value more than a predetermined value, e.g. 100Ω or more, are used. If ordinary lead wires are used, it is likely that a short-circuit will occur after the breaking of wire, which may cause smoking or ignition. The current passed through the voltage detecting lead wire is small, for example, about several µA. That is, it is not necessary to pass a particularly large current through the voltage detecting lead wires. Therefore, lead wires having a resistance value of 1 kΩ, for example, may be used as the voltage detecting lead wires.

In FIG. 7, the thermal fuse 42 is inserted in series in a current path. The thermal fuses 43 are disposed at respective places on the circuit board where heat may be generated, and connected in series. The heating resistor 44 is arranged so that when the FET Q1 or the FET Q2 turns on, an electric current flows through the heating resistor 44 to generate heat, causing the thermal fuse 42 to be fused. The liquid detecting portion 41 reduces in its resistance value when detecting a liquid. At this time, the gate voltage of the FET Q1 rises. Consequently, the FET Q1 turns on, causing the heating resistor 44 to generate heat. Thus, the thermal fuse 42 in the current pass is fused. When detecting fusing of any of the series-connected thermal fuses 43, the microcomputer 45 turns on the FET Q2, causing the heating resistor 44 to generate heat and thus fusing the thermal fuse 42 in the current path. By these control operations, charging or both charging and discharging are disabled.

In the case of an ordinary thermal fuse, when the cell temperature becomes higher than a predetermined temperature, the thermal fuse, which forms a charge/discharge current path, is blown to disable charging and discharging. However, when the number of cells is large, for example, it is necessary to insert a large number of thermal fuses into the current path. This causes the voltage drop to increase unfavorably. Therefore, only one thermal fuse 42 is disposed in the charge/discharge current path, and with respect to the other thermal fuses 43, the microcomputer 45 performs detection as to whether or not any of the thermal fuses 43 has been fused. To disable charging or both charging and discharging, it is possible to use a method in which the charge-and-discharge control FET 33 is turned off permanently, or a method in which the thermal fuse 42 inserted in the charge/discharge current is fused, as stated above.

Figure 8:
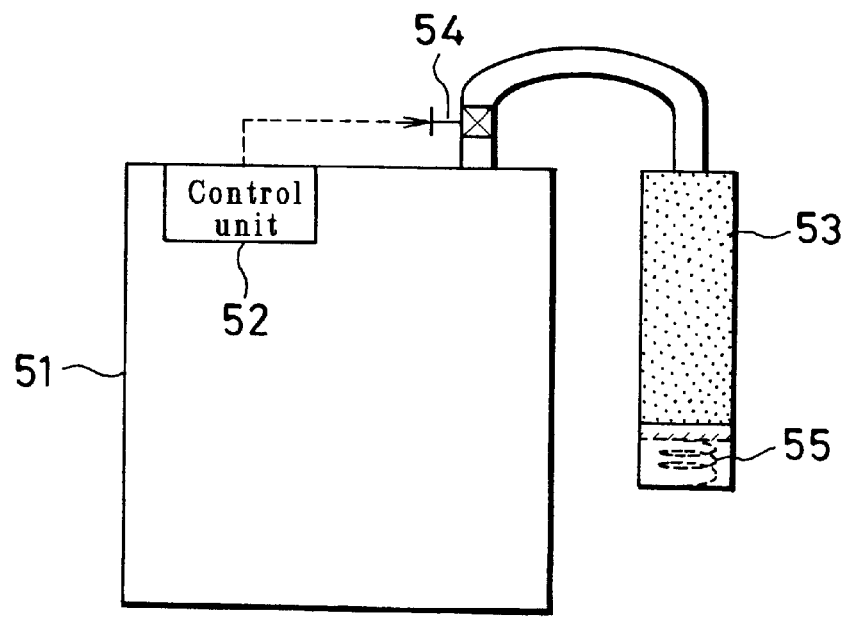
FIG. 8 is a diagram showing another embodiment of the battery pack according to the present invention in which a flame-resisting substance, e.g. silicon, is filled into the battery pack when necessary.

The arrangement may be such that when the expiration of the lifetime or a loss of functional status that involves a strong possibility of ignition or smoking is detected by any of the above-described devices or functions, a flame-resisting substance, e.g. silicon, is filled into the battery pack. FIG. 8 is a diagram showing another embodiment of the battery pack according to the present invention in which a flame-resisting substance, e.g. silicon, is filled into the battery pack when necessary. In the figure: reference numeral 51 denotes a battery pack; 52 denotes a control unit; 53 denotes a cylinder filled with a flame-resisting substance; 54 denotes a valve; and 55 denotes a pressurizer. The cylinder 53 is filled with a compressed liquid or powdered flame-resisting substance, e.g. silicon. The pressurizer 55 is, for example, a spring for compressing the flame-resisting substance. When the valve 54 is opened, the flame-resisting substance in the cylinder 53 is filled into the casing of the battery pack 51 through the valve 54. The valve 54 is opened under the control of the control unit 52 when the expiration of the lifetime or a loss of functional status that involves a strong possibility of ignition or smoking is detected by any of the above-described devices or functions. At this time, the flame-resisting substance is filled into the casing of the battery pack so as to wrap each cell of the battery or the circuit board, thereby allowing the battery to have heat insulating properties and thus preventing the battery from influencing the outside even when it heats up to a high temperature. If the flame-resisting substance contains an extinguishing agent, it is possible to extinguish a fire or smoking when the circuit board, the casing or the like ignites or smokes.

It should be noted that the present invention is not limited to the foregoing embodiments but can be modified in a variety of ways. For example, with respect to a battery pack having lost its function owing to the completion of the span of life and a marked degradation in function, it is possible to adopt any of control for disabling charging or both charging and discharging, control for inhibiting charging or both charging and discharging, control for stopping charging or discharging, control for forcedly discharging each cell, and control for issuing an alarm, and also possible to use any combination of these control operations. Further, there are various modifications of combinations of control operations.

As will be clear from the foregoing description, the present invention provides a battery pack arranged to make a judgment concerning a loss of functional status and to perform selectively charge-and-discharge control and forced discharge control according to the judgment. The battery pack includes a charge-and-discharge control device for charging and discharging a battery and a forced discharge control device for forcedly discharging each cell. A function detecting device detects a functional status of the battery pack. A judging device makes a judgment concerning a loss of functional status detected by the function detecting device. A control device selectively controls the charge-and-discharge control device and the forced discharge control device according to the judgment concerning a loss of functional status made by the judging device, whereby charge-and-discharge control and forced discharge control are selectively performed according to the judgment concerning a loss of functional status. Therefore, a battery pack having lost its function owing to the completion of the span of life and a marked degradation in function is judged to be one having lost its functional status, and charge-and-discharge control and forced discharge control can be selectively performed according to the judgment. Thus, it is possible to limit the use of the battery pack judged to be unusable by executing appropriate processing.

The function detecting device may include a timer for measuring the elapsed time since the date of manufacture. In this case, the judging device judges whether or not there is a loss of functional status according to whether or not the elapsed time is more than a predetermined value. The function detecting device may include, in addition to the timer, one of a counting device for counting the number of charge/discharge cycles, a temperature detecting device for detecting an average temperature of the battery pack, and a measuring device for measuring the charging rate of the battery pack. In this case, the elapsed time is corrected by one of the number of charge/discharge cycles, the average temperature and the charging rate. The function detecting device may include a temperature detecting device for detecting an average temperature and a timer for measuring the elapsed time since the date of manufacture in accordance with a doubling rule by which a period of time elapsed is doubled for every 10° C. rise in the average temperature. In this case, the judging device judges whether or not there is a loss of functional status according to whether or not the elapsed time is more than a predetermined value. The function detecting device may include a counting device for counting the number of charge/discharge cycles. In this case, the judging device judges whether or not there is a loss of functional status according to whether or not the number of charge/discharge cycles is more than a predetermined value. The function detecting device may include a capacity detecting device for detecting a full-charge capacity. In this case, the judging device judges whether or not there is a loss of functional status according to whether or not the full-charge capacity is less than a predetermined value. The function detecting device may include a device for accumulating a discharge or charge capacity. In this case, the judging device judges whether or not there is a loss of functional status according to whether or not the accumulated capacity value is more than a predetermined value. Accordingly, a judgment concerning a loss of functional status due to the expiration of the lifetime can be made with high accuracy.

In addition, the function detecting device may include a device for measuring a temperature and an electric current. In this case, the judging device judges whether or not there is a loss of functional status according to whether or not the charge-and-discharge efficiency at a predetermined temperature and a predetermined current value measured by the device is less than a predetermined value. The function detecting device may include a device for measuring a temperature and an electric current. In this case, the judging device judges whether or not there is a loss of functional status according to whether or not the self-discharge current from the battery at a predetermined temperature measured by the device is more than a predetermined value. The function detecting device may include a device for detecting an electric current. In this case, the judging device judges whether or not there is a loss of functional status from the value of charge/discharge current measured by the device. The function detecting device may include a device for detecting a cell voltage. In this case, the judging device judges whether or not there is a loss of functional status from the value of the cell voltage. The function detecting device may include a device for detecting a battery voltage and an electric current. In this case, the judging device judges whether or not there is a loss of functional status from the battery voltage and electric current value detected by the detecting device. The function detecting device may include a device for detecting a temperature. In this case, the judging device judges whether or not there is a loss of functional status according to whether or not the temperature of the battery pack or the temperature of the cell is more than a predetermined value, or whether or not the time interval during which the temperature of the battery pack or the temperature of the cell is more than a predetermined value is more than a predetermined period of time. The function detecting device may include a device for detecting the temperature at each of at least three points. In this case, the judging device judges whether or not there is a loss of functional status according to whether or not the difference between the temperature at one of the three points and an average value of the temperatures at the other two of the three points is more than a predetermined value. The function detecting device may include a device for measuring the internal impedance at a predetermined temperature. In this case, the judging device judges whether or not there is a loss of functional status according to whether or not the internal impedance is more than a predetermined value. Accordingly, a judgment concerning a loss of functional status can be made accurately even during a charging or discharging operation.

In addition, the function detecting device may include a label to be stuck on the battery pack or the cell, the label having a conductor wire or a thin conductive film disposed all over the reverse side thereof. In this case, the judging device judges whether or not there is a loss of functional status according to whether or not the conductor wire is broken. The function detecting device may include a pressure sensor or an impact sensor. In this case, the judging device judges whether or not there is a loss of functional status according to whether or not a pressure or impact applied to the battery pack is more than a predetermined value, or whether or not a pressure or impact more than a predetermined value has been applied to the battery pack more than a predetermined number of times, or whether or not a pressure or impact more than a predetermined value has been applied to the battery pack for more than a predetermined period of time. The function detecting device may include a strain sensor for detecting a strain on the battery pack. In this case, the judging device judges whether or not there is a loss of functional status according to whether or not the strain is more than a predetermined value. The function detecting device may include a gas sensor for detecting a leakage of the electrolyte. In this case, the judging device judges whether or not there is a loss of functional status according to whether or not the value of detected gas leakage is more than a predetermined value. The function detecting device may include one or a plurality of thermal fuses disposed at places on the circuit board where heat may be generated. In this case, the judging device judges that there is a loss of functional status from fusing of any of the thermal fuses. Accordingly, a judgment concerning a loss of functional status due to external damage or the like can also be made accurately.

In addition, the arrangement may be such that on condition that the judging device has judged that there is a loss of functional status, the control device disables charging or both charging and discharging through the charge-and-discharge control device and moreover forcedly discharges each cell of the battery pack through the forced discharge control device. The charge-and-discharge control device may disable charging or both charging and discharging through a semiconductor device for on-off controlling charging and discharging or a thermal fuse inserted in the current path for charging and discharging, the thermal fuse being fused when charging or both charging and discharging are to be disabled. The arrangement may also be such that according to the judgment concerning a loss of functional status made by the judging device, the control device performs one of the operation of disabling charging or both charging and discharging, the operation of inhibiting charging or both charging and discharging and the operation of stopping charging or discharging by controlling the charge-and-discharge control device and forcedly discharges each cell by controlling the forced discharge control device and further performs control for issuing an alarm according to need. In addition, the control device may perform control for filling a flame-resisting substance into the battery pack according to the judgment concerning a loss of functional status made by the judgment device. Accordingly, appropriate processing can be executed in accordance with the judgment concerning a loss of functional status.

I claim:

1. A battery pack arranged to make a decision concerning a loss of functional status and to perform selectively charge-and-discharge control and forced discharge control according to the decision, said battery pack comprising:

charge-and-discharge control means for charging and discharging a battery;

forced discharge control means for forcedly discharging each cell;

function detecting means for detecting a functional status of said battery pack;

judging means for making a decision concerning a loss of functional status detected by said function detecting means; and control means for selectively controlling said charge-and-discharge control means and forced discharge control means according to the decision concerning a loss of functional status made by said judging means, whereby charge-and-discharge control and forced discharge control are selectively performed according to the decision concerning a loss of functional status, wherein the loss of functional status is when a usable life of the battery pack is determined as approaching an end as determined by an elapsed time since manufacture of the battery pack or a number of charge-discharge cycles exceeds a predetermined number.

2. A battery pack according to claim 1, wherein said function detecting means includes timer means for measuring an elapsed time since a date of manufacture, wherein said judging means judges whether or not there is a loss of functional status according to whether or not said elapsed time is more than a predetermined value.

3. A battery pack according to claim 2, wherein said timer means includes a non-volatile memory, so that said elapsed time is stored n said non-volatile memory before measurement is suspended owing to a drop in battery voltage, and when the battery voltage is restored by charging, time is measured in succession to said elapsed time.

4. A battery pack according to claim 3, wherein said timer means estimates a period of time during which the measurement was suspended and adds the estimated period of time to said elapsed time.

5. A battery pack according to claim 2, wherein said timer means includes: storage means for storing a date of manufacture;

communication means for acquiring a present date from an external device by communication; and computing means for calculating an elapsed time from said date of manufacture to said present date.

6. A battery pack according to any one of claims 2 to 5, wherein said function detecting means includes, in addition to said timer means, one of:

counting means for counting a number of charge/discharge cycles;

temperature detecting means for detecting an average temperature of said battery pack; and measuring means for measuring a charging rate of said battery pack;

wherein said elapsed time is corrected by one of said number of charge/discharge cycles, said average temperature and said charging rate.

7. A battery pack according to claim 1, wherein said function detecting means includes:

temperature detecting means for detecting an average temperature; and timer means for measuring an elapsed time since a date of manufacture in accordance with a doubling rule by which a period of time elapsed is doubled for every 10° C. rise in said average temperature;

wherein said judging means judges whether or not there is a loss of functional status according to whether or not said elapsed time is more than a predetermined value.

8. A battery pack according to claim 1, wherein said function detecting means includes counting means for counting a number of charge/discharge cycles, wherein said judging means judges whether or not there is a loss of functional status according to whether or not said number of charge/discharge cycles is more than a predetermined value.

9. A battery pack according to claim 1, wherein said function detecting means includes capacity detecting means for detecting a full-charge capacity, wherein said judging means judges whether or not there is a loss of functional status according to whether or not said full-charge capacity is less than a predetermined value.

10. A battery pack according to claim 1, wherein said function detecting means includes means for accumulating a discharge or charge capacity, wherein said judging means judges whether or not there is a loss of functional status according to whether or not said accumulated capacity value is more than a predetermined value.

11. A battery pack according to claim 1, wherein said function detecting means includes means for measuring a temperature and an electric current, wherein said judging means judges whether or not there is a loss of functional status according to whether or not a charge-and-discharge efficiency at a predetermined temperature and a predetermined current value measured by said means is less than a predetermined current value.

12. A battery pack according to claim 1, wherein said function detecting means includes means for measuring a temperature and an electric current, wherein said judging means judges whether or not there is a loss of functional status according to whether or not a self-discharge current from the battery at a predetermined temperature measured by said means is more than a predetermined value.

13. A battery pack according to claim 1, wherein said function detecting means includes for detecting an electric current, wherein said judging means judges whether or not there is a loss of functional status from a value of charge/discharge current measured by said means.

14. A battery pack according to claim 13, wherein said judging means judges whether or not there is a loss of functional status according to whether or not a peak current exceeding a predetermined value has flowed as said charge/discharge current for more than a predetermined period of time or more than a predetermined number of times.

15. A battery pack according to claim 14, wherein said control means temporarily disables charging and discharging through said charge-and-discharge control means on condition that said judging means has judged that there that there is a loss of functional status, and after a predetermined period of time has passed, said control means enables charging and discharging permanently according to a peak current value.

16. A battery pack according to claim 13, wherein said judging means judges whether or not there is a loss of functional status according to whether or not said battery pack is incapable of being fully charged even if an electric current has flowed for a specified period of time.

17. A battery pack according to claim 1, wherein said function detecting means includes means for detecting a cell voltage,
wherein said judging means judges whether or not there is a loss of functional status from a value of said cell voltage.

18. A battery pack according to claim 17, wherein said judging means judges whether or not there is a loss of functional status according to whether or not any of cell voltages is less than a minimum value.

19. A battery pack according to claim 17, wherein said judging means judges whether or not there is a loss of functional status according to whether or not any of cell voltages is more than a maximum value.

20. A battery pack according to claim 17, wherein said judging means judges whether or not there is a loss of functional status according to whether or not a difference between a minimum cell voltage and a maximum cell voltage is more than a desired operating value.

21. A battery pack according to claim 1, wherein said function detecting means includes detecting means for detecting a battery voltage and an electric current,
wherein said judging means judges whether or not there is a loss of functional status from the battery voltage and electric current value detected by said detecting means.

22. A battery pack according to claim 21, wherein said judging means judges whether or not there is a loss of functional status according to whether or not a precharge time is longer than a predetermined period of time when said battery pack is precharged with a voltage less than a specified voltage and a specified electric current.

23. A battery pack according to claim 21, wherein said judging means calculates a value of electric current other than a charge/discharge current on a basis of a variation in battery voltage and an electric current, and judges whether or not there is a loss of functional status according to whether or not said value of electric current is more than a variation value.

24. A battery pack according to claim 1, wherein said function detecting means includes means for detecting a temperature,
wherein said judging means judges whether or not there is a loss of functional status according to whether or not a temperature of said battery pack or a temperature of the cell is more than an operating limit, or whether or not a time interval during which the temperature of said battery pack or the temperature of the cell is more than an operating limit for more than a given period of time.

25. A battery pack according to claim 1, wherein
said function detecting means includes means for detecting a temperature at each of at least three points,
wherein said judging means judges whether or not there is a loss of functional status according to whether or not a difference between a temperature at one of the three points and an
average value of temperatures at the other two of said three points is more than a differential.

26. A battery pack according to claim 1, wherein said function detecting means includes means for measuring an internal impedance at a predetermined temperature,
wherein said judging means judges whether or not there is a loss of functional status according to whether or not said internal impedance is more than a specified impedance.

27. A battery pack according to claim 1, wherein
said function detecting means includes means for detecting a battery voltage, an electric current and a temperature,
wherein when there is a variation in said battery voltage, a sampling period for detection of a battery voltage, an electric current and a temperature is shortened.

28. A battery pack according to claim 1, wherein said function detecting means and judging means have a non-volatile memory for storing detecting data and judgement data when there is a drop in battery voltage.

29. A battery pack according to claim 1, wherein said function detecting means includes a label to be stuck on said battery pack or cell, said label having a conductor wire or a thin conductive film disposed all over a reverse side thereof,
wherein said judging means judges whether or not there is a loss of functional status according to whether or not said label is separated or whether or not the conductor wire is broken.

30. A battery pack according to claim 1, wherein said function detecting means includes a pressure sensor or an impact sensor,
wherein when judging that there is a loss of functional status, said judging means compares a voltage, an electric current and a temperature measured after before judging the loss of functional status with those measured before judging the loss of functional status to judge whether or not there is a sharp variation in voltage, electric current or temperature, and said control means temporarily disables charging or both charging and discharging through said charge-and-discharge control means on condition that said judging means had judged that there is a loss of functional status, and if there is not said sharp variation thereafter, said control means restores charging and discharging functions.

31. A battery pack according to claim 30, wherein
said function detecting means includes means for detecting a voltage, an electric current and a temperature,
wherein when judging that there is a loss of functional status, said judging means compares a voltage, an electric current and a temperature measured after judging the loss of functional status with those measured before judging the loss of function status to judge whether or not there is a variation in voltage, electric current or temperature, and said control means temporarily disables charging or both charging and discharging through said charge-and-discharge control means on condition that said judging means has judged that there is a loss of functional status, and if there is not said sharp variation thereafter, said control means restores charging and discharging functions.

32. A battery pack according to claim 31, wherein said function detecting means shortens a sampling period during the time interval between the instant when said judging means judges that there is a loss of functional status and the instant when said control means restores charging and discharging functions.

33. A battery pack according to claim 1, wherein said function detecting means includes a strain sensor for detecting a strain on said battery pack, wherein said judging means judges whether or not there is a loss of functional status according to whether or not said strain is more than a predetermined value.

34. A battery pack according to claim 1, wherein said function detecting means includes a gas sensor for detecting a leakage of an electrolyte, wherein said judging means judges whether or not there is a loss of functional status according to whether or not a value of detecting gas leakage is more than a predetermined value.

35. A battery pack according to claim 1, wherein said function detecting means includes one or a plurality of thermal fuses disposed at places on a circuit board where heat may be generated, wherein said judging means judges that there is a loss of functional status from fusing of any of said thermal fees.

36. A battery pack according to claim 1, wherein said control means disables charging or both charging and discharging through charge-and-discharge control means on condition that said judging means has judged that there is a loss of functional status.

37. A battery pack according to claim 1, wherein, on condition that said judging means has judged that there is a loss of functional status, said control means disables charging or both charging and discharging through said charge-and-discharge control means and moreover forcedly discharges each cell of said battery pack through said forced discharge control means.

38. A battery pack according to claim 36 or 37, wherein said charge-and-discharge control means disables charging or both charging and discharging through a semiconductor device for on-off controlling charging and discharging or a thermal fuse inserted in a current path for charging and discharging, said thermal fuse being fused when charging or both charging and discharging are to be disabled.

39. A battery pack according to claim 1, wherein, according to the decision concerning a loss of functional status made by said judging means, said control means performs one of an operation of disabling charging or both charging and discharging, an operation of inhibiting charging or both charging and discharging and an operation of stopping charging or discharging by controlling said charge-and-discharge control means and forcedly discharges each cell by controlling said forced discharge control means and further performs control for issuing an alarm according to need.

40. A battery pack according to claim 1, wherein said control means performs control for filling a flame-resisting substance into said battery pack according to the decision concerning a loss of functional status made by said judgment means.

41. A battery pack arranged to make a decision concerning a loss of functional status and to perform selectively charge-and-discharge control and forced discharge control according to the decision, said battery pack comprising:

charge-and-discharge control means for charging and discharging a battery;

forced discharge control means for forcedly discharging each cell;

liquid detecting means for detecting a liquid leakage in said battery pack; and control means for disabling charging or both charging and discharging by controlling said charge-and-discharge control means and for forcedly discharging each cell of said battery pack by controlling said forced discharge control means on condition that a liquid leakage has been detected by said liquid detecting means.

42. A battery pack according to claim 41, wherein control for disabling charging or both charging and discharging is performed through a fusible portion that is fused by detecting a liguid.

* * * * *